United States Patent [19]
Woodard

[11] 3,819,222
[45] June 25, 1974

[54] WIND DEFLECTOR FOR DUMP TRUCKS
[76] Inventor: Boyd Ray Woodard, 1085 N.E. 89th St., Miami, Fla. 33138
[22] Filed: Dec. 21, 1972
[21] Appl. No.: 317,171

[52] U.S. Cl. .............................. 296/1 S, 298/1 R
[51] Int. Cl. .......................................... B62d 35/00
[58] Field of Search .................. 296/1 S, 28 D, 91; 298/1 R; 105/2 A, 2 R

[56] References Cited
UNITED STATES PATENTS
| | | | |
|---|---|---|---|
| 2,914,231 | 11/1959 | Hornke | 296/91 X |
| 3,015,517 | 1/1962 | Thornburgh | 296/91 |
| 3,134,628 | 5/1964 | Lackey et al. | 296/28 D |
| 3,241,876 | 3/1966 | Saunders | 296/1 S |
| 3,415,566 | 12/1968 | Kerrigan | 296/1 S |
| 3,596,974 | 8/1971 | Adams | 296/1 S |

*Primary Examiner*—David Schonberg
*Assistant Examiner*—John A. Pekar

[57] ABSTRACT

A wind deflector for fixed attachment to a top front portion of the load body of a dump truck, said deflector being configured to deflect the windstream generally upwardly and over the main body portion of the load body and upwardly and outwardly relative to the respective longitudinal side portions thereof.

5 Claims, 3 Drawing Figures

PATENTED JUN 25 1974

3,819,222

WIND DEFLECTOR FOR DUMP TRUCKS

STATE OF THE PRIOR ART

U.S. Pat. No. 3,415,566 to W. H. Kerrigan discloses a streamlining apparatus for a cargo-carrying vehicle having a front and side flat walls comprising air entrapment means having wall portions and means for securing side wall portions to said front flat wall whereby, upon movement of said vehicle, said air entrapping means forming a streamline buffer of air at said wall portions for reducing the resistance of the following air whereby siid buffer of air directs the following air in close proximity to said side walls.

U.S. Pat. No. 3,348,873 to W. S. Saunders discloses means for reducing lateral wind resistance and consequent body sway, and yaw in vehicles. Briefly, this patent, as with the first mentioned patent, is directed to providing a baffle which causes a relatively wide diffusion of the air impacting the forward portions of the trailer and causing the same to re-adhere to the body rearwardly of the front portion in a relatively smooth and even manner.

In like manner, U.S. Pat. No. 3,309,131 to Walter Selden Saunders is directed to providing a baffle and causes a relatively wide diffusion of the airstream impacting a forward portion of the vehicle body and causes the same to re-adhere to the sides and top of the body rearwardly of the front portion thereof in a relatively smooth and even manner.

U.S. Pat. Nos. 3,549,198 to I. Capello and 3,549,197 to L. F. Sibley disclose greatly similar devices comprised generally of a cover for a dump truck body which is longitudinally movable from a retracted position upon a reel mounted on the front end of a truck to an extended position overlying the truck body.

BACKGROUND OF THE PRESENT INVENTION

The present invention is directed to a wind deflector means for dump trucks which is fixed relative to the top front portion of the load carrying body of a dump truck in a manner whereby the windstream is deflected so as to have little or no effect on the load of material contained in said body.

Many dump trucks are employed to haul relatively fine, loose materials, such as dirt, sand and gravel which readily blow from the dump trucks, particularly when they attain a relatively high speed, such as occurs on our modern expressways. This condition poses a problem for motorists and particularly for motorcyclists; trucks carrying this type of cargo have acquired the nickname of "sandblasters." Cargos of this nature are generally wet or at least damp to an extent that, in addition to causing a considerable amount of irritation to a motorist or cyclist because of the sandblasting effect, they deposit a gooey residue not only on the car or motorcycle body, but on the windshields as well, creating a real hazard, particularly after dark. A further hazard created by this condition is that many people will hasten their efforts to pass a truck, so laden, thereby increasing their chances of becoming involved in an accident.

The wind deflector of the present invention comprises a baffle which includes a main center portion, curved upwardly and rearwardly in a manner whereby the main portion of the airstream, passing over the load body of the truck, is deflected upwardly and rearwardly away from the material in the load body. A pair of oppositely extending end wing portions of the baffle are curved in a manner so as to deflect the opposed side portions of the airstream upwardly and outwardly from the material in the load body.

In this manner, a void or semi-void is created in the areas of the top of the load body, preventing the sandblasting effect, created by the exposed top areas of certain materials in the load body at relatively high speeds. A side effect of the void condition, created by the baffle of the present invention, is a very substantial reduction of load body drag which substantially counterbalances or overbalances the drag effect of the baffle.

It is particularly desirable to deflect the opposed side portions of the airstream upwardly and outwardly to protect oncoming traffic in rainy or wet road conditions. A direct outward deflection of the airstream would subject oncoming traffic to a substantial spray of water, thereby creating another hazard.

DETAILED DESCRIPTION OF THE INVENTION

Figure 1:
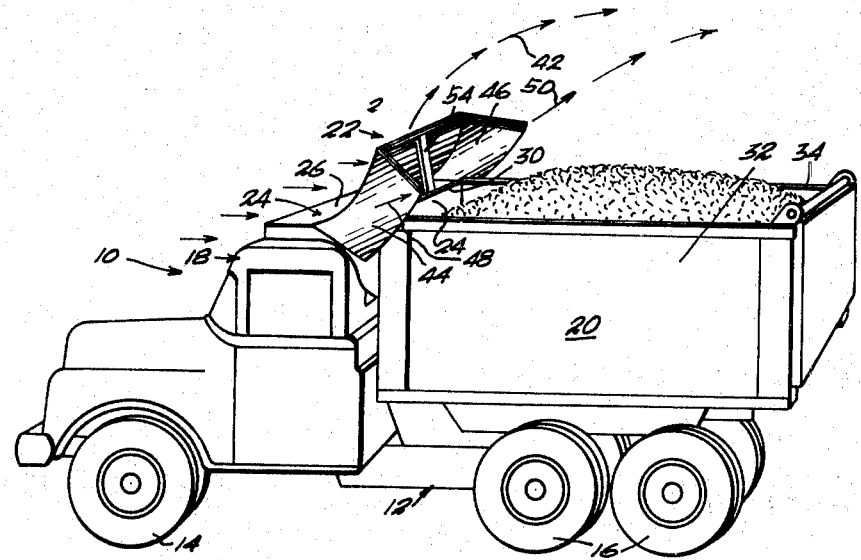
FIG. 1 is a perspective view of a typical dump truck employing the protective wind deflector of the present invention.

With reference to the drawings in which like reference characters designate like or corresponding parts throughout the different views and with particular reference to FIG. 1, a typical dump truck 10 is illustrated which includes a frame or chassis 12, front and rear wheels 14 and 16, a driver's cab 18 and a dump type load-carrying body 20, the deflector means of the present invention being indicated generally at 22.

Most dump trucks include a forwardly extending protector member 24 over the driver's cab 18, which is carried in a fixed relation to the front wall 24 of the load body 20. In the illustration of FIG. 1, the deflector means 22 is fixed by any conventional means such as by rivets, nuts and bolts or welding to the top surface 26 of the protector member 24. For this purpose, a flat bottom plate 28, FIG. 2, spans the bottom of the deflector means 22. If such a protector member 24 is not provided by the load body or is unsuitable for the installation of the deflector means 22, said deflector means may be permanently installed relative to the top edge 30 of the front wall 24 in a manner so as to span the top front portions of the side walls 32 and 34 of the load body 20. The deflector means may, in fact, be mounted directly to the top of the roof of the driver's cab. It is desirable, however, that in all types of installations, the deflector means 20 is mounted in a manner whereby the airstream cannot pass thereunder to lift any particles from the top of the material contained in the load body 20.

Figure 2:
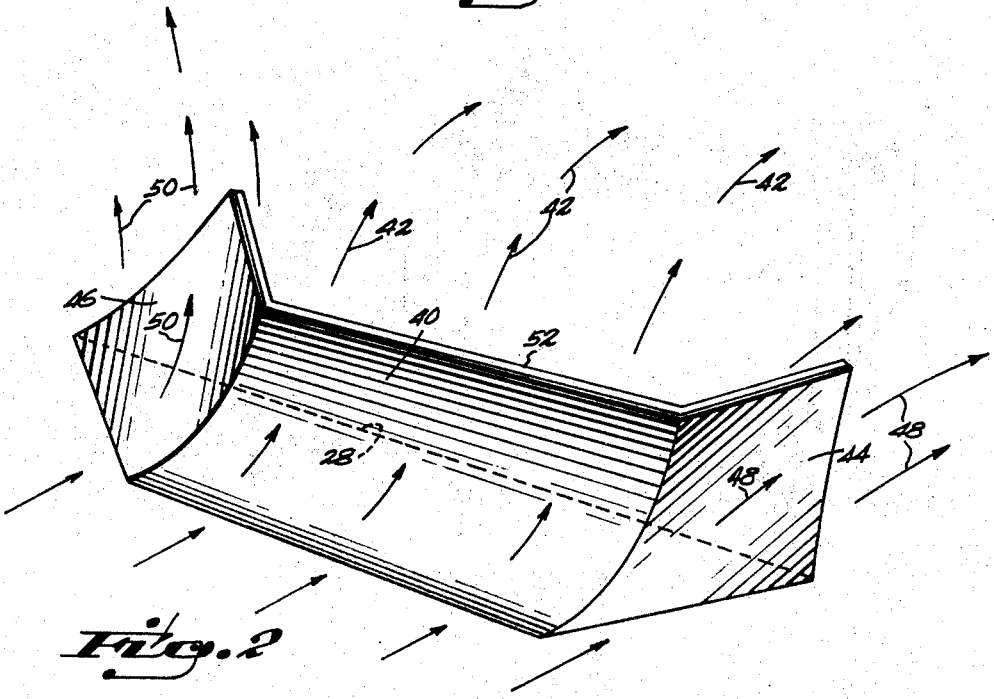
FIG. 2 is an enlarged perspective view of the wind deflector, removed from the dump truck, and illustrating the path of wind deflection provided thereby.

Referring to FIGS. 1 and 2, the deflector means 22 includes a central portion 40, spanning the main width of the load body 20 and providing an upwardly, rearwardly sweeping curved surface to direct the airstream, passing thereover, because of the forward movement of the truck, in a generally upward and rearward direction to pass above the material in the load body as indicated by the arrows 42.

A pair of opposed side wing portions 44 and 46 extend outwardly of the respective ends of the central portion 40 and are curved in a manner, as best illustrated in FIG. 2, to direct those portions of the airstream, passing along the respective sides of the dump truck, upwardly, outwardly and rearwardly as indicated by the arrows 48 and 50. The upper edges of the center and side portions 40, 48 and 50 preferably include stiffening means indicated generally at 52. Any type of frame or brace members, such as indicated generally at 54 in FIG. 1, may be provided to form an integral, rigid unit. The braces or frames are not illustrated in detail because it would be well within the capabilities of any experienced metal worker to construct braces or frames which would be adapted to any custom or standard installations.

Figure 3:
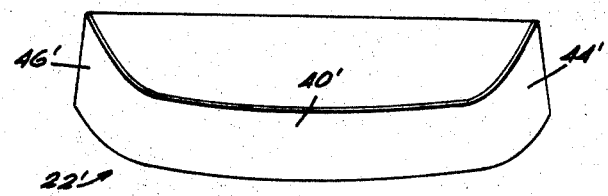
FIG. 3 is a schematic top plan view of a somewhat modified form of wind deflector in accordance with the present invention.

FIG. 3 schematically illustrates a top view of a modified, one-piece form of the present invention 22' in which the central major portion 40' is curved to function in the same manner as the center portion 40 in FIGS. 1 and 2. In like manner, the opposed side wings 44' and 46' are curved to deflect the side portions of the airstream upwardly, outwardly and rearwardly.

It will be obvious to anyone skilled in the art that other modifications can be made in the structure and design characteristics of the present invention which will produce the same end results without departing from the true spirit of the invention as defined in the appended claims.

What is claimed is:

1. A rigid wind deflector for attachment to a dump truck to deflect the airstream passing over the load-carrying body thereof in a manner whereby certain types of material contained in the load body will not be caught up in the windstream, said wind deflector comprising; a baffle having a main central portion with a main continuous front surface with opposite side end zones and with a lower transverse edge and an upper transverse edge, said baffle being fixed rigidly relative to the front wall of the load body and being of a configuration with said upper edge being spaced rearwardly of said lower edge and front wall and said main surface defining an upwardly and rearwardly sweeping curved deflector surface to direct the central portion of the airstream, passing over the dump truck, upwardly a substantial distance above the material contained in the load body, and a pair of opposed side wing portions, extending outwardly of the respective end zones of said baffle configured to define generally outwardly and rearwardly sweeping curved surfaces relative to the respective side walls of the load body to direct the respective side portions of the airstream outwardly relative to the material contained in the body.

2. A wind deflector as defined in claim 1 wherein said main central baffle portion substantially spans the width of the load body and said pair of opposed side wing portions extend a predetermined distance outwardly of the respective side walls of the load body.

3. A wind deflector as defined in claim 1 wherein said main central portion and pair of opposed side wing portions are individually formed and joined together as by welding.

4. A wind deflector as defined in claim 1 wherein said main central portion and pair of opposed side wing portions are unitarily formed.

5. A wind deflector for attachment to a dump truck to deflect the airstream passing over the load-carrying body thereof in a manner whereby certain types of material contained in the load body will not be caught up in the windstream, said wind deflector comprising a baffle having a main central portion, fixed rigidly relative to the front wall of the load body and being configured to direct the central portion of the airstream, passing over the dump truck, upwardly a substantial distance above the material contained in the load body, and a pair of opposed side wing portions, extending outwardly of the respective ends of said central portion, configured to direct the respective side portions of the airstream upwardly and outwardly relative to the material contained in the load body, said wind deflector including frame means joining said central and wing portions to form a unitary rigid structure and to provide means for rigid mounting relative to the front wall of the load body.

* * * * *